(12) United States Patent
Griffing et al.

(10) Patent No.: US 11,692,437 B2
(45) Date of Patent: Jul. 4, 2023

(54) LOGGING TOOL FERRITES AND METHODS OF MANUFACTURE

(71) Applicant: Halliburton Energy Services, Inc., Houston, TX (US)

(72) Inventors: Matthew Chase Griffing, Kingwood, TX (US); Jin Ma, Houston, TX (US); Michael Bittar, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 239 days.

(21) Appl. No.: 16/961,885

(22) PCT Filed: Jan. 31, 2019

(86) PCT No.: PCT/US2019/016120
§ 371 (c)(1),
(2) Date: Jul. 13, 2020

(87) PCT Pub. No.: WO2019/182686
PCT Pub. Date: Sep. 26, 2019

(65) Prior Publication Data
US 2020/0370424 A1    Nov. 26, 2020

Related U.S. Application Data

(60) Provisional application No. 62/645,103, filed on Mar. 19, 2018.

(51) Int. Cl.
*E21B 47/12* (2012.01)
*G01V 3/28* (2006.01)
*G01V 11/00* (2006.01)

(52) U.S. Cl.
CPC ............. *E21B 47/12* (2013.01); *G01V 3/28* (2013.01); *G01V 11/002* (2013.01)

(58) Field of Classification Search
CPC .......... E21B 47/12; E21B 47/16; E21B 47/01; G01V 3/28; G01V 11/002; G01V 11/00
See application file for complete search history.

(56) References Cited

U.S. PATENT DOCUMENTS

| | | | | |
|---|---|---|---|---|
| 4,707,382 | A * | 11/1987 | Tajima | G03G 15/0921 118/631 |
| 5,002,677 | A * | 3/1991 | Srail | C08K 3/22 428/900 |
| 7,879,269 | B1 | 2/2011 | Dening et al. | |
| 2014/0083771 | A1 * | 3/2014 | Clark | E21B 47/13 175/40 |

(Continued)

OTHER PUBLICATIONS

ISRWO International Search Report and Written Opinion for PCT/US2019/016120 dated May 17, 2019.

*Primary Examiner* — Blake Michener
*Assistant Examiner* — Yanick A Akaragwe
(74) *Attorney, Agent, or Firm* — Benjamin Ford; C. Tumey Law Group PLLC

(57) ABSTRACT

A method of fabricating a ferrite for use in a resistivity logging tool includes providing an uncured ferrite material, and pressing the uncured ferrite material into a channel to form the ferrite. The channel is defined on a surface of a bobbin associated with the resistivity logging tool, and the channel can be arcuate and extend at an angle offset from a central axis of the bobbin. The uncured ferrite material is then cured in place within the channels on the bobbin.

20 Claims, 9 Drawing Sheets

(56) References Cited

U.S. PATENT DOCUMENTS

| | | |
|---|---|---|
| 2016/0369578 A1* | 12/2016 | Korovin .................. H01Q 1/04 |
| 2017/0160423 A1 | 6/2017 | Prakash et al. |
| 2017/0184753 A1 | 6/2017 | Prakash et al. |
| 2017/0256839 A1 | 9/2017 | Korovin et al. |
| 2017/0261632 A1 | 9/2017 | Griffing |

* cited by examiner

LOGGING TOOL FERRITES AND METHODS OF MANUFACTURE

BACKGROUND

During drilling operations for the extraction of hydrocarbons, a variety of recording and transmission techniques are used to provide or record real-time data from the vicinity of a drill bit. Measurements of the surrounding subterranean formations may be made throughout drilling operations using downhole measurement and logging tools, such as measurement-while-drilling (MWD) and/or logging-while-drilling (LWD) tools, which help characterize the formations and aide in making operational decisions. Wellbore logging tools make measurements that may be used to determine the electrical resistivity (or its inverse conductivity) of the formations being penetrated, where the electrical resistivity indicates various features of the formations. Those measurements may be taken using one or more antennas coupled to the wellbore logging tools.

Logging tool antennas are often formed by positioning coil windings about an axial section of the logging tool, such as a drill collar. Ferrite materials or "ferrites" (or magnetic materials in general) are sometimes positioned beneath the coil windings to increase the efficiency and/or sensitivity of the antenna. The ferrites facilitate a higher magnetic permeability path (i.e., a flux conduit) for the magnetic field generated by the coil windings, and help shield the coil windings from the drill collar and associated losses (e.g., eddy currents generated on the drill collar). Since the ferrites have the capability of shaping and manipulating the generated magnetic field, great care must be taken when designing the ferrite geometry to prevent undesired effects. Due to the increased use of tilted or directional coil windings, however, the shape of the ferrites has become quite complex, and very difficult and/or cumbersome to machine.

As a result, ferrites are more recently being molded and/or pressed into desired geometric shapes and configurations. Briefly, molding ferrites includes mixing a powder iron/ferrite material with a binder, such as a silicone-based rubber, an elastomer, a room-temperature vulcanized (RTV) silicone, other polymers (such as polyimide), a ceramic, or an epoxy-based material. The mixture is then pressed into a mold, where it conforms to the intricate geometry of the mold. This molding process, however, can result in non-homogenous ferrites or ferrites that exhibit a large variance in relative permeability (i.e., non-homogeneity) even when molded from the same mixture. Such non-homogeneity and variance in permeability may adversely affect field roundness and/or symmetry, which is critical for logging tools.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to wellbore logging tools and, more particularly, to controlling and/or compensating for varying permeability of molded ferrites by manipulating the geometry and structure of the molded ferrites.

Embodiments described herein exploit the use of a high length-to-width aspect ratio for a ferrite to enhance the magnetic field in the long (length) dimension and thereby ensure that the effective permeability of the short (width) dimension remains low compared to the long dimension. Embodiments described herein also use non-magnetic dividers between laterally adjacent ferrites to prevent contact of the adjacent ferrites and thereby prevent a continuous magnetic path therebetween. The present disclosure provides practical ways to control and otherwise compensate for the variation in homogeneity of molded ferrites through manipulation of their geometries (e.g., aspect ratios) and through air-gapping or laminations.

Figure 1:
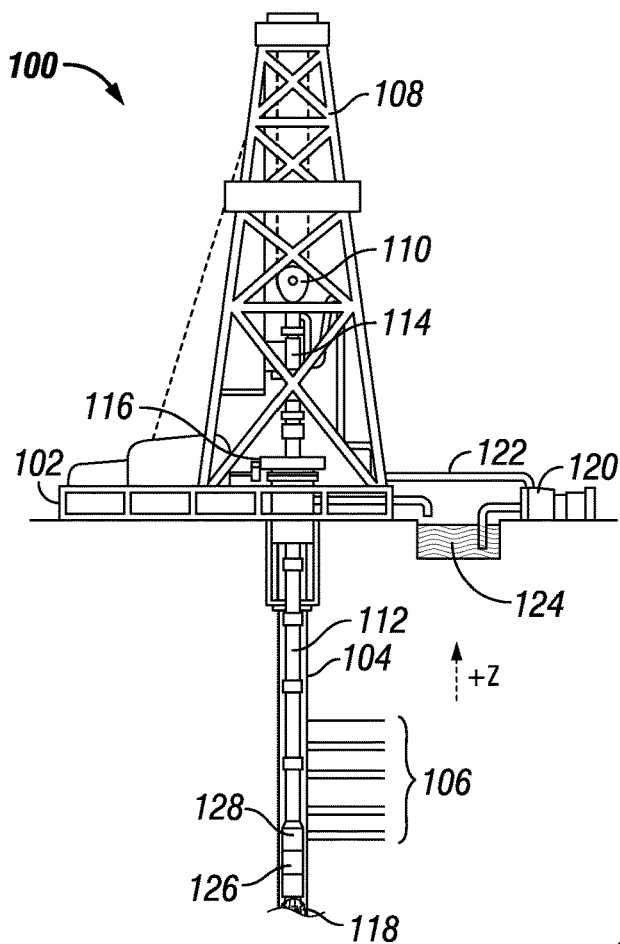
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one resistivity logging tool 126, which may comprise a plurality of antennae capable of receiving and/or transmitting one or more electromagnetic (EM) signals that are axially spaced along the length of the logging tool 126. As will be described in detail below, the resistivity logging tool 126 may further comprise a plurality of ferrites used to enhance and/or shield the EM signals and thereby increase the azimuthal sensitivity of the logging tool 126.

As the drill bit 118 extends the wellbore 104 through the formations 106, the resistivity logging tool 126 may collect azimuthally-sensitive measurements relating to the resistivity of the formations 106, i.e., how strongly the formations 106 opposes a flow of electric current. The logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the resistivity logging tool 126 may also be stored within the logging tool 126 or the telemetry module 128 for later retrieval at the surface upon retracting the drill string 112.

Figure 2:
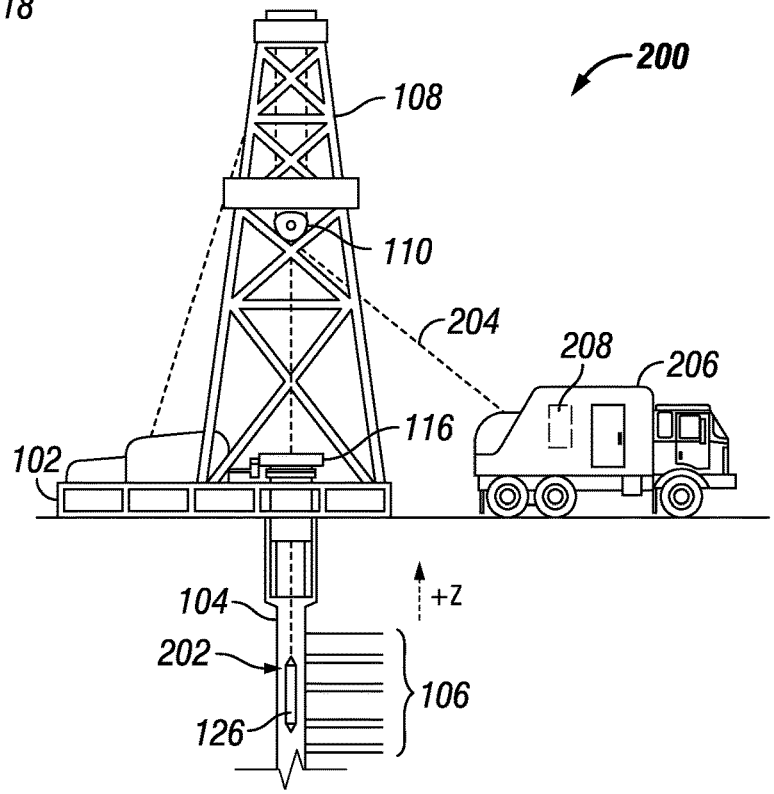
FIG. 2 is a schematic diagram of an exemplary wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again in detail. As illustrated, the wireline system 200 may include a wireline instrument sound 202 that may be suspended into the wellbore 104 by a cable 204. The logging tool 202 may include a resistivity logging tool 126, which may be communicably coupled to the conveyance 204. The conveyance 204 may include conductors for transporting power to the logging tool 202 and/or facilitate communication between the surface and the logging tool 202. A logging facility 206, shown in FIG. 2 as a truck, may collect measurements from the resistivity logging tool 126, and may include computing facilities 208 for controlling, processing, storing, and/or visualizing the measurements gathered by the resistivity logging tool 126. The computing facilities 208 may be communicably coupled to the logging/measurement tool 126 by way of the conveyance 204.

Figure 3A:
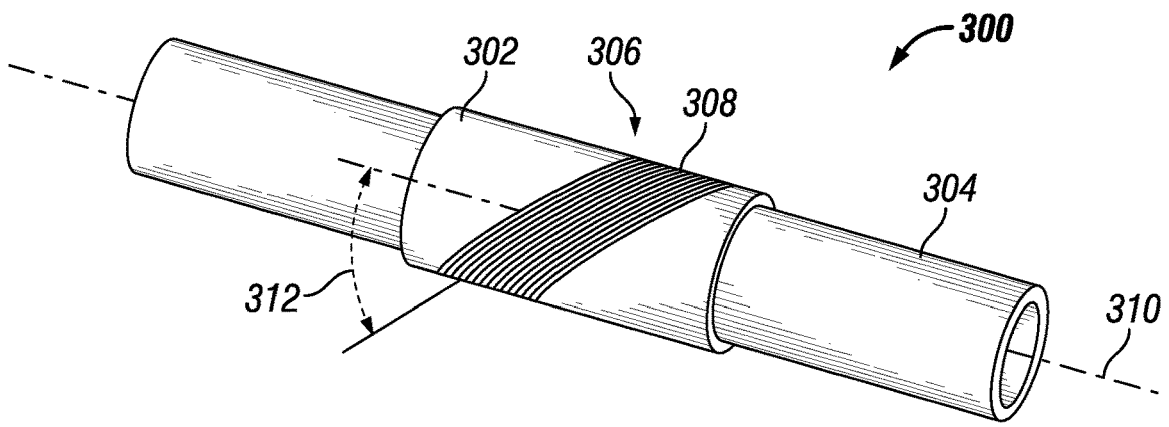
FIGS. 3A and 3B are partial views of an exemplary resistivity logging tool.
Figure 3B:
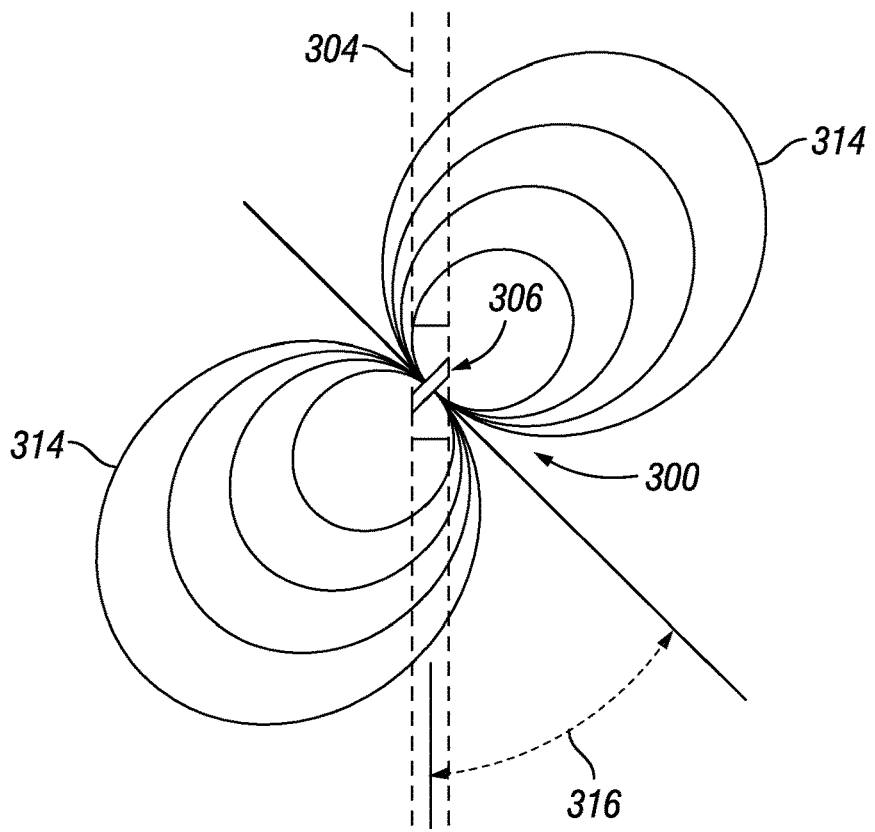

Referring now to FIGS. 3A and 3B, illustrated are partial views of a resistivity logging tool 300, according to one or more examples. The logging tool 300 may be the same as or similar to the resistivity logging tool 126 of FIGS. 1 and 2 and, therefore, may be used in the drilling or wireline systems 100, 200. In FIG. 3A, the resistivity logging tool 300 is depicted as including a bobbin 302 positioned about a tool mandrel 304, such as a drill collar. The bobbin 302 may be formed of a high temperature plastic, thermoplastic, polymer (e.g., polyimide), a ceramic, or an epoxy material, but could alternatively be made of a variety of other non-magnetic, electrically insulating/non-conductive materials. The bobbin 302 may be fabricated, for example, by additive manufacturing (i.e., 3D printing), injection molding, machining, or other known processes.

The bobbin 302 may comprise multiple layers concentric to one another. For example, the bobbin 302 may comprise an inner layer and an outer layer, wherein an inner surface of the outer layer of bobbin 302 may be in communication with an outer surface of the inner layer of bobbin 302. In some embodiments, the inner layer and the outer layer may be the same material. In some embodiments, the inner layer and outer layer may be different materials.

The resistivity logging tool 300 may further include an antenna 306, which may comprise a coil winding 308 wrapped about the bobbin 302 and extending axially along at least a portion thereof. The coil winding 308 may form any number of turns or windings about the bobbin 302 and may be positioned within corresponding grooves (not labeled) defined in the outer surface of the bobbin 302. The coil winding 308 may be concentric or eccentric relative to a central axis 310 of the tool mandrel 304.

As illustrated, the coil winding 308 may be disposed about the bobbin 302 at an angle 312 offset from the central axis 310. As a result, the antenna 306 may be characterized as a "tilted coil" or "directional" antenna. In the illustrated embodiment, the angle 312 is 45°, but could alternatively be any angle offset from the central axis 310. As best seen in FIG. 3B, when current passes through the coil winding 308 of the antenna 306, a dipole magnetic field 314 may be generated that extends radially outward from the antenna 306 orthogonal to the winding direction. As a result, the tilted antenna 306 may exhibit a magnetic field angle 316 with respect to the tool mandrel 304. Since the angle 312 is 45°, the magnetic field angle 316 may also be 45°. As will be appreciated, however, the magnetic field angle 316 may be altered by adjusting or manipulating the angle 312.

Figure 4A:
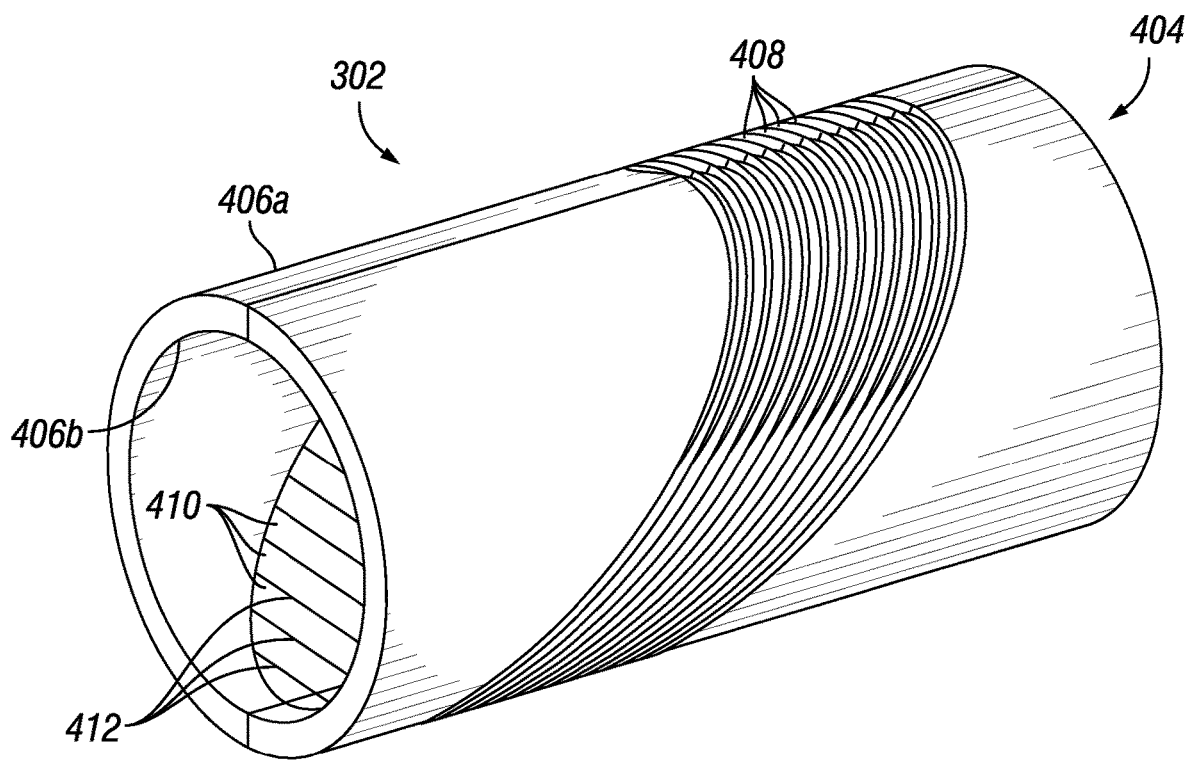
FIGS. 4A-4C depict enlarged isometric views of the bobbin and a plurality of ferrites, in accordance with some embodiments of the present disclosure.
Figure 4B:
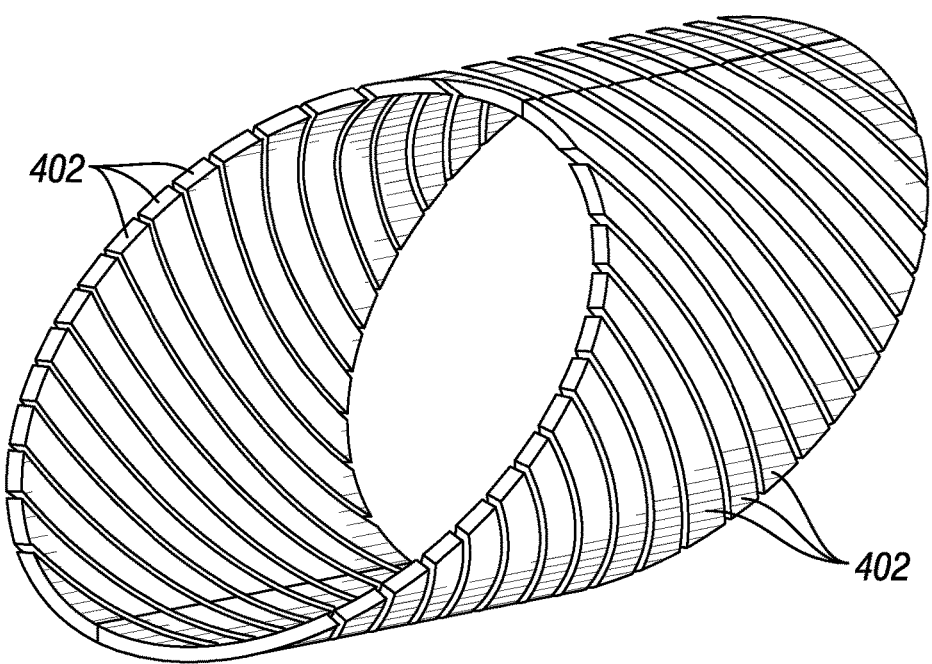

Referring now to FIGS. 4A and 4B, with continued reference to FIGS. 3A and 3B, illustrated are enlarged isometric views of the bobbin 302 and a plurality of ferrites 402, respectively, according to one or more embodiments. As depicted in FIG. 4A, the bobbin 302 may comprise a generally cylindrical body 404. In some embodiments, as illustrated, the body 404 may be made up of two or more arcuate sections or members. In other embodiments, however, the body 404 may comprise a monolithic structure.

Figure 4C:
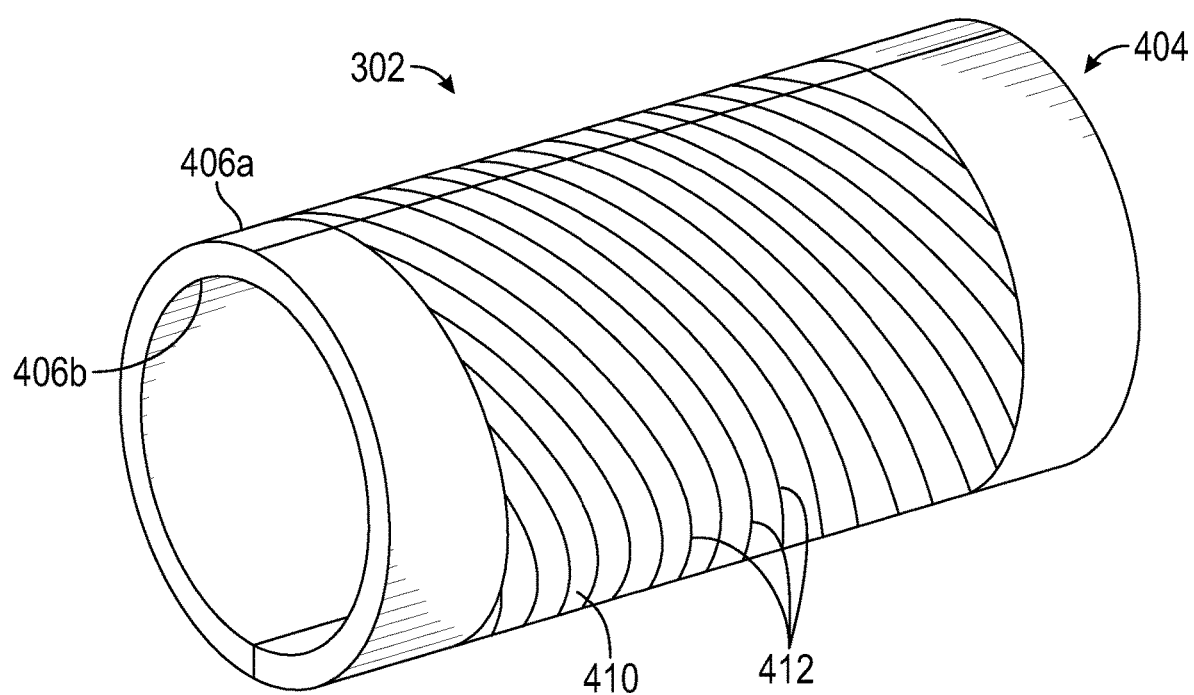

The body 404 may provide an outer surface 406a and an inner surface 406b. As illustrated, a plurality of grooves 408 may be defined on the outer surface of the body 404, and a plurality of channels 410 may be defined on the inner surface 406b of the body 404. In some embodiments, the channels 410 may be defined on the outer surface of the body 404 (FIG. 4C). The grooves 408 may be configured to receive the coil winding 308 (FIG. 3A) to provide the antenna 306 (FIGS. 3A and 3B), and the channels 410 may be configured to receive the ferrites 402 shown in FIG. 4B. Accordingly, the ferrites 402 may be positioned to interpose the coil winding 308 and the underlying tool mandrel 304 (FIG. 3A) and shield the coil winding 308 from eddy currents generated by the tool mandrel 304, thereby increasing the azimuthal sensitivity of the logging tool 300 (FIGS. 3A-3B) and/or increasing the efficiency/field strength of the antenna. Moreover, the channels 410 may be defined in the body 404 generally orthogonal to the grooves 408; i.e., at an angle rotated 90° from the angle 312 (FIG. 3A) offset from the central axis 310 (FIG. 3A). Accordingly, the ferrites 402 may be characterized as "tilted" ferrites as they are required to be tilted about the curvature of the body 404.

In some embodiments, each channel 410 may be configured to receive a single ferrite 402. In other embodiments, however, each channel 410 may be configured to receive two or more ferrites 402 arranged end-to-end. In some embodiments, the channels 410 may be defined on the outer surface of the body 404 to facilitate co-locating the ferrites 402 directly beneath antenna 306 (FIGS. 3A and 3B). In some embodiments, the channels 410 may be defined on the outer surface of an inner layer or an intermediate layer of bobbin 302 (FIG. 3A), and the grooves 408 may be defined on an outer layer of bobbin 302.

In some embodiments, as illustrated, each channel 410 may be separated by a ridge or divider 412 defined on the inner surface 406b of the body 404 and extending radially inward. When the ferrites 402 may be received within the channels 410, the dividers 412 may serve to prevent physical contact between laterally adjacent ferrites 402, and thereby prevent a continuous magnetic path between the adjacent ferrites 402. As part of the bobbin 302, the dividers 412 may also be made of a high temperature plastic, thermoplastic, polymer (i.e., polyimide), a ceramic, or an epoxy material, which exhibits a relative permeability ($\mu_r$) of approximately 1, which is equivalent to the permeability of free space or air ($\mu_o$). Accordingly, the dividers 412 may be considered substantially equivalent to providing air gaps between the adjacent ferrites 402, often called "air-gapping," which essentially serves as a non-magnetic insulator between the adjacent ferrites 402. The length-to-width aspect ratio of each ferrite 402 may be orthogonal to the coil winding 308, and the dividers 412 may prove advantageous in ensuring that the effective permeability of each ferrite 402 along its width remains low as compared to its length.

As illustrated, each "tilted" ferrite 402 may exhibit a complex geometry having a unique cross-section that may be twisted and arched to conform to the curvature of the channels 410 and the inner surface 406b of the body 404. As a result, it is quite difficult to accurately machine the ferrites 402. Instead, as mentioned above, the ferrites 402 may be molded to conform to the required intricate geometries of each channel 410. More particularly, a ferrite powder may be mixed with a binder, such as an uncured rubber or elastomer (e.g., a silicone-based rubber or elastomer), a ceramic, a polymer and/or an epoxy material, and the mixture may then be rolled between a pair of rollers in an attempt to obtain a homogeneous mixture pressed to a desired thickness. The ferrite 402 may then be inserted and otherwise pressed into a mold that conforms to the intricate geometry of a corresponding channel 410 of the bobbin 302. As a result, each ferrite 402 may be molded to the specific geometry of its corresponding channel 410.

Figure 5:
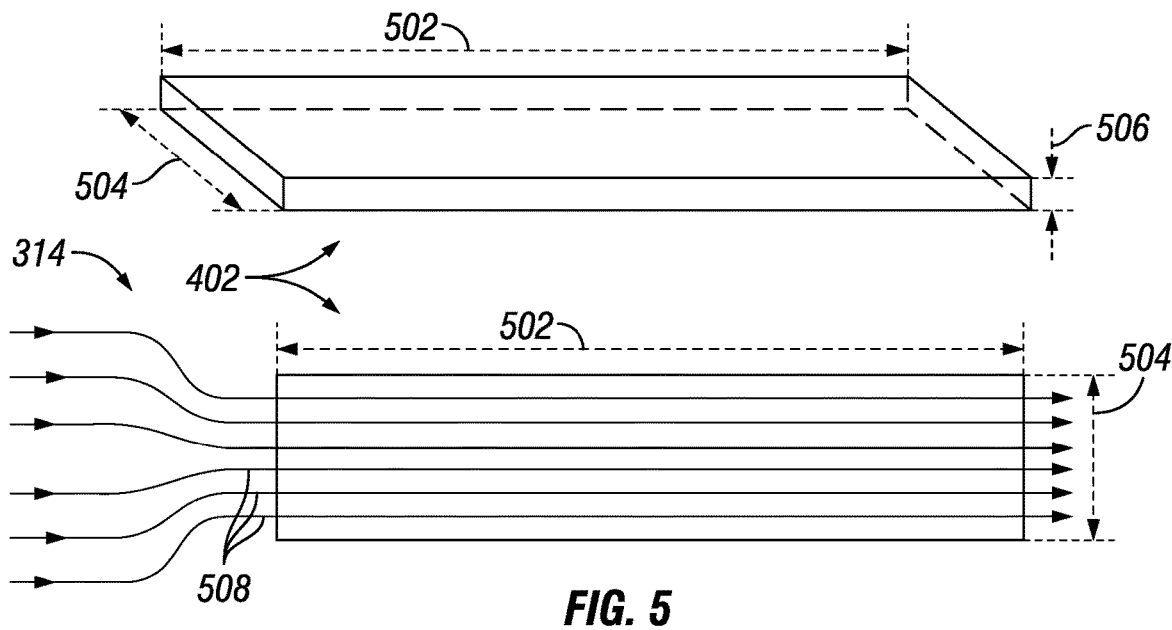
FIG. 5 depicts isometric and top views of an exemplary ferrite.

Referring to FIG. 5, with continued reference to FIGS. 4A-4B, illustrated are isometric and top views of an exemplary ferrite 402, flattened for illustrative purposes. As illustrated, the ferrite 402 may generally be a rectangular structure that exhibits a length 502, a width 504, and a thickness 506. As shown in the top view of FIG. 5, the ferrite 402 may exhibit a generally homogeneous and/or isotropic permeability. As a result, the magnetic flux lines 508 of the magnetic field 314 may proceed through the ferrite 402 in a direction aligned with and otherwise parallel to the length 502. Since the permeability of the ferrite 402 may generally be homogenous, the ferrite 402 may serve to enhance the magnetic field 314, without substantially affecting its intended direction or distribution.

In practice, however, the ferrites 402 may not all exhibit a homogeneous and/or isotropic permeability but may instead exhibit varying permeability that may adversely affect the direction of the magnetic field 314. In examples, varying permeability may result from the molding process used to fabricate the ferrites 402. For instance, the rollers used to mix the ferrite powder and the uncured rubber or elastomer may have to be continuously cooled due to frictional heating, which may cause the rubber or elastomer to start curing prematurely or otherwise require that the process pause intermittently to allow additional cooling time. Moreover, the sitting time between mixing and molding may also allow the ferrite powder in the mixture to settle, separate, or clump unevenly throughout the mixture, which may adversely affect resulting permeability.

Figure 6:
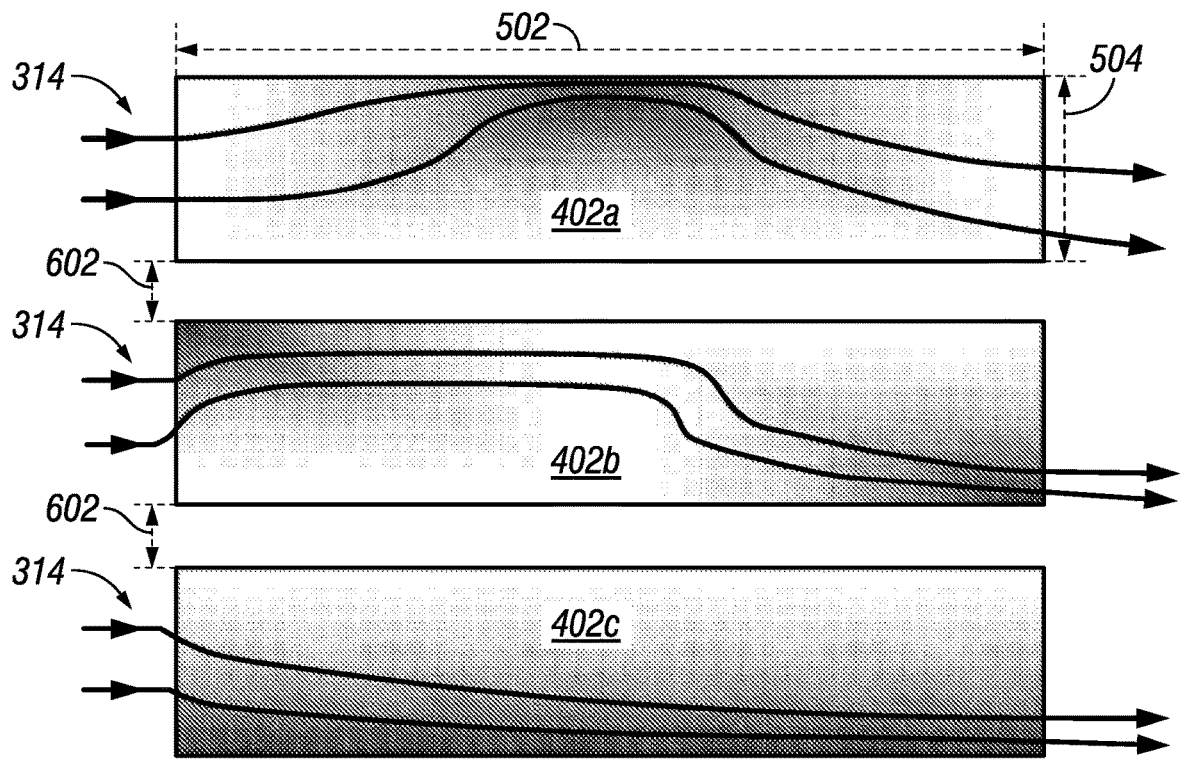
FIG. 6 depicts top views of three non-homogeneous molded ferrites.

FIG. 6 depicts top views of three non-homogeneous molded ferrites 402, shown as a first ferrite 402a, a second ferrite 402b, and a third ferrite 402c, each having its length 502 aligned with the direction of the magnetic field 314. The shading in each ferrite 402a-c corresponds to magnetic permeability, where the darker shading corresponds to higher magnetic permeability and the lighter shading corresponds to lower magnetic permeability. As illustrated, adjacent ferrites 402a-c may be separated by corresponding gaps 602, which may be provided by the dividers 412 (FIG. 4A) and therefore exhibit a very low permeability (i.e., approximately 1 or equivalent to being "air-gapped"). Since the magnetic flux lines of the magnetic field 314 may tend to move through paths of highest magnetic permeability, the gaps 602 may help maintain the magnetic flux lines within the ferrite 402 as the magnetic flux lines proceed along the direction of the length 502. The net effect of the non-homogeneous ferrites 402, however, may result in a change in the intended direction, distribution, and/or angle 316 (FIG. 3B) of the magnetic field 314.

According to embodiments of the present disclosure, the magnetic field 314 along the length 502 of each ferrite 402 may be enhanced or otherwise controlled by manipulating the geometry of each ferrite 402. This may be done either post-manufacture or during the design phase of a particular ferrite 402. In examples, this may serve to constrain the magnetic field 314 to smaller dimensions and thereby mitigate substantive changes in the direction and/or the angle 316 (FIG. 3B) of the magnetic field 314. In at least one example, the aspect ratio between the length 502 and the width 504 of each ferrite 402 may be increased to minimize the net effect of the direction and/or the angle 316 of the magnetic field 314, even when using non-homogenous molded ferrites 402. More particularly, scaling down the width 504 of the molded ferrites 402 with respect to the length 502 (i.e., increasing the aspect ratio) may result in obtaining better control over the direction/distribution of the magnetic field 314.

Figure 7A:
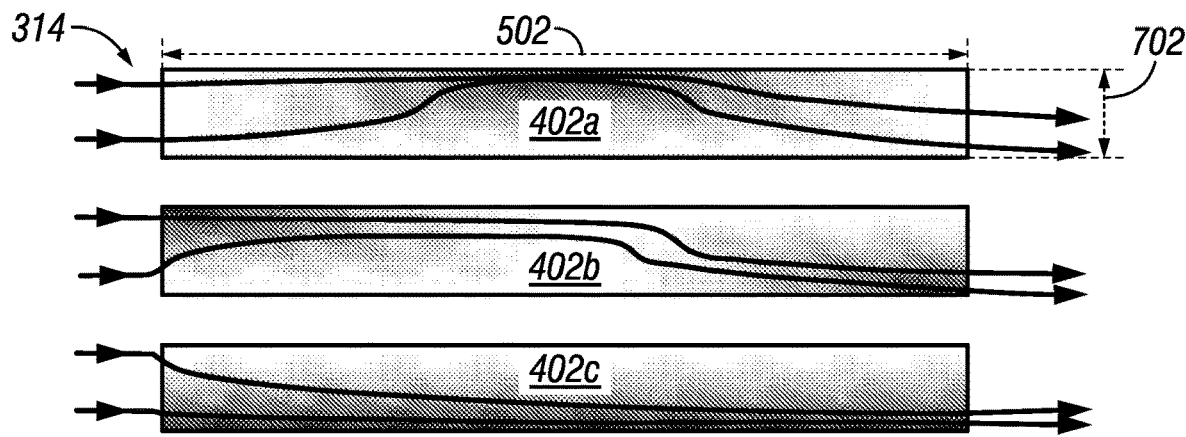
FIGS. 7A and 7B depict the three ferrites of FIG. 6 with a reduced width.
Figure 7B:
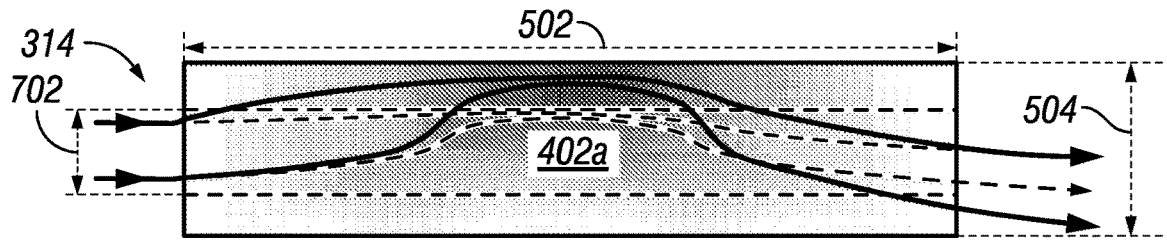

This is illustrated in FIGS. 7A and 7B, which depict the ferrites 402a-c with a reduced width 702. More particularly, while maintaining the identical permeability distribution, the reduced width 702 of each ferrite 402a-c is about half of the initial width 504 (FIG. 7B). As illustrated, increasing the aspect ratio between the length 502 and the width 504 in each ferrite 402a-c improves the straightness of the magnetic flux lines of the magnetic field 314 passing through the non-homogenous ferrites 402a-c.

In the enlarged view of FIG. 7B, the first ferrite 402a is shown before and after the aspect ratio is increased. The solid magnetic flux lines are representative of the magnetic field 314 before the aspect ratio is increased, and therefore extend into the larger width 504. The dashed magnetic flux lines are representative of the magnetic field 314 after the aspect ratio is increased, and therefore extend only into the smaller or reduced width 702. As illustrated, the net effect on the direction of the magnetic field 314 is reduced (e.g., by approximately half).

This increase in length/width aspect ratio may also have the added benefit of decreasing the demagnetizing factor ($N_z$, which opposes/reduces the magnetic field 314) in the direction of the length 502 (z) direction, thus increasing the effective magnetic permeability of the ferrites 402a-c. Those skilled in the art may recognize that this is the same well defined/characterized effect that is seen in cylindrical rod or ellipsoidal ferrite cores, as shown in Equations (1), (2), and (3) below:

$$\mu_{\textit{eff}} = \frac{\mu_r}{1 + N_z(\mu_r - 1)} \quad (1)$$

where $\mu_{\textit{eff}}$ is effective permeability; $\mu_r$ is relative permeability of ferrite material; and $N_z$ is the demagnetizing factor. For cylindrical rod/ellipsoidal cores:

$$N_z = \frac{1}{m^2 - 1}\left(\frac{m}{\sqrt{m^2 - 1}}\ln\left(m + \sqrt{m^2 - 1}\right) - 1\right) \quad (2)$$

where m is length/diameter aspect ratio. And simplification for m>>1 yields:

$$N_z = \frac{1}{m^2}(\ln(2m) - 1) \quad (3)$$

Although the above expressions for the demagnetizing factor $N_z$ describe specifically the cylindrical rod/ellipsoidal core geometry, those skilled in the art will readily recognize that the general inverse relationship between length/diameter (or length/width) aspect ratio and $N_z$ is true for any geometry/core shape. In other words, longer/thinner core geometries may have lower $N_z$ and higher effective permeability.

Figure 8:
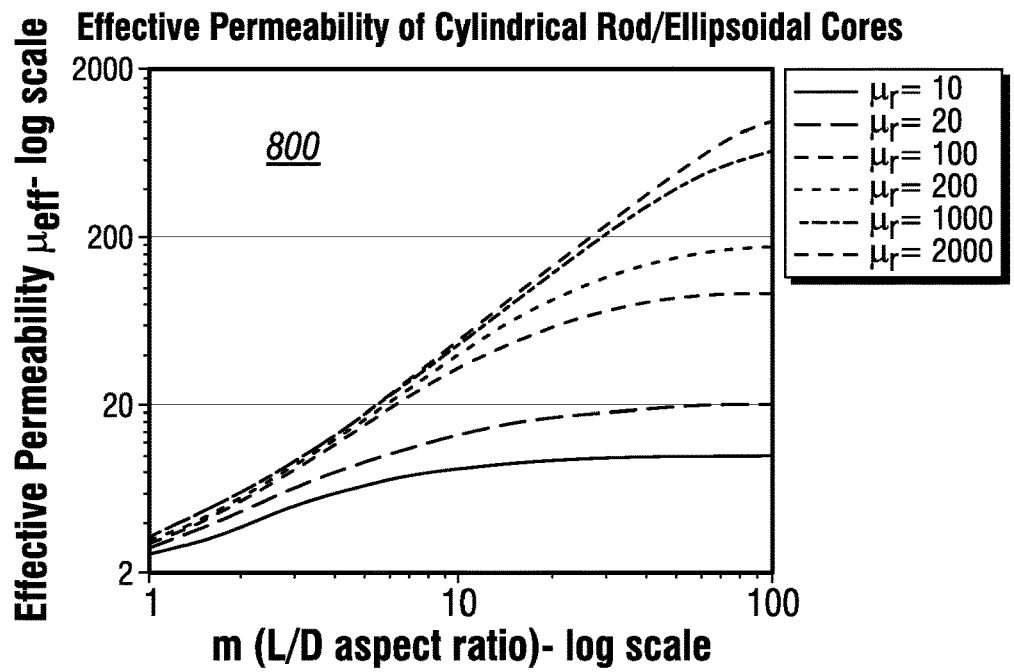
FIG. 8 depicts a plot that compares the effective permeability ($\mu_{eff}$) of rod/ellipsoidal ferrites with relative permeability ($\mu_r$).

Equation (1) may show that the variability in relative permeability between different ferrites may be attenuated by decreasing the length/diameter aspect ratio, due to the increase in the demagnetizing factor $N_z$. FIG. 8 depicts a plot 800 that compares the effective permeability ($\mu_{\textit{eff}}$) of rod/ellipsoidal ferrites with relative permeability ($\mu_r$) of 10, 20, 100, 200, 1000, and 2000. As shown in the plot 800, as the aspect ratio is reduced, the difference in effective permeability decreases and the curves converge, particularly at higher relative permeability, which in general would be desirable for resistivity antennas (e.g., the antenna 306 of FIGS. 3A and 3B). Again, although the plot 800 employs the analytical expression for the demagnetizing factor $N_z$ of a cylindrical rod/ellipsoidal core to compute the effective permeability, the same relationship may be observed by reducing the length/width aspect ratio of the ferrites 402a-c.

Figure 9:
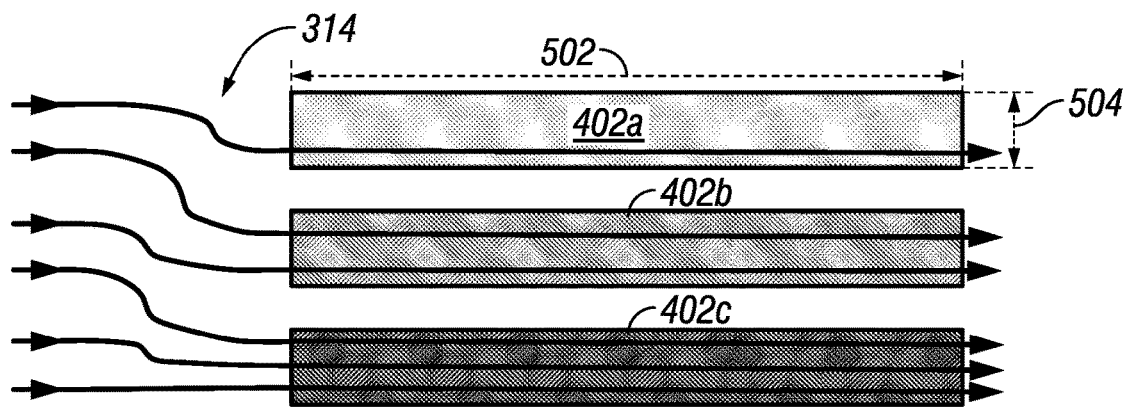
FIG. 9 depicts the ferrites of FIG. 6, where each ferrite exhibits a homogenous magnetic permeability, but the magnetic permeability is different.

In alternative examples, the aspect ratio between the length 502 and the width 504 in each ferrite 402a-c may be reduced such that the variation in effective permeability between adjacent ferrites 402a-c may be constrained and otherwise minimized to mitigate the impact on the direction/distribution of the magnetic field 314. For instance, FIG. 9 depicts the ferrites 402a-c, where each ferrite 402a-c exhibits a homogenous magnetic permeability, but the magnetic permeability of each ferrite 402a-c is different. As illustrated, the magnetic permeability of the third ferrite 402c is greater than the magnetic permeability of the second ferrite 402b, which is greater than the magnetic permeability of the first ferrite 402a. In such embodiments, the third ferrite 402c may tend to draw or pull more of the magnetic field 314 through its path. The result is a net change in concentration/distribution of the magnetic field 314 along the length 502.

At reduced aspect ratios, however, the effective permeability of the ferrites 402a-c with varying relative permeability converges. Accordingly, decreasing the length 502 and/or increasing the width 504 of each ferrite 402a-c (i.e., decreasing the length/width aspect ratio) may reduce the difference in effective magnetic permeability of adjacent ferrites 402a-c, which may minimize the adverse effects on the direction and/or distribution of the magnetic field 314. It is noted that this may result in a decrease in effective permeability and is, therefore, counter to the above-described method of controlling non-homogeneity of a ferrite 402a-c by increasing the length/width aspect ratio to ensure a straighter magnetic field 314 through the ferrite 402a-c. Therefore, a design tradeoff may have to be made, weighing the effects of both the variance in permeability among different ferrites 402a-c, and the non-homogeneity within an individual ferrite 402a-c, on the angle/distribution of the magnetic field 314.

Accordingly, manipulating the geometry of any of the ferrites 402 described herein, may entail adjusting any one of the length 502, the width 504, and the thickness 506 of the specific ferrite 402 to a desired aspect ratio, and thereby resulting in an optimized magnetic permeability of the ferrite 402 in the direction of the magnetic field passing therethrough. Manipulating the geometry of the ferrites 402 may be done either post-manufacture, during the design phase of the ferrites 402, or both. For instance, the geometry of a manufactured ferrite 402 may be manipulated by making fine or coarse adjustments to the body of the ferrite 402, such as by grinding, cutting, and/or machining specific portions of the ferrite 402. As will be appreciated this may allow a user to fine tune the magnetic field angle/direction and/or shape to a desired magnetic permeability. In such examples, the bobbin 302 (FIG. 3A) may or may not need to be adjusted to accommodate the new dimensions of the ferrite 402. In at least one scenario, small spacers or shims may be employed to hold the modified ferrite 402 in place and otherwise centralized within the corresponding channel 410.

In other examples, the geometry and aspect ratio of a particular ferrite 402 may be manipulated during the design phase of the particular ferrite 402. In such examples, one or more design iterations may take place to optimize the magnetic permeability. Moreover, in such examples, the dimensions of the bobbin 302 (FIG. 3A) may also be modified, if needed, to accommodate the new dimensions of the ferrite 402. In yet other examples, the geometry of the ferrites 402 may be done through a combination of both post-manufacturing adjustments and design phase adjustments.

Figure 10:
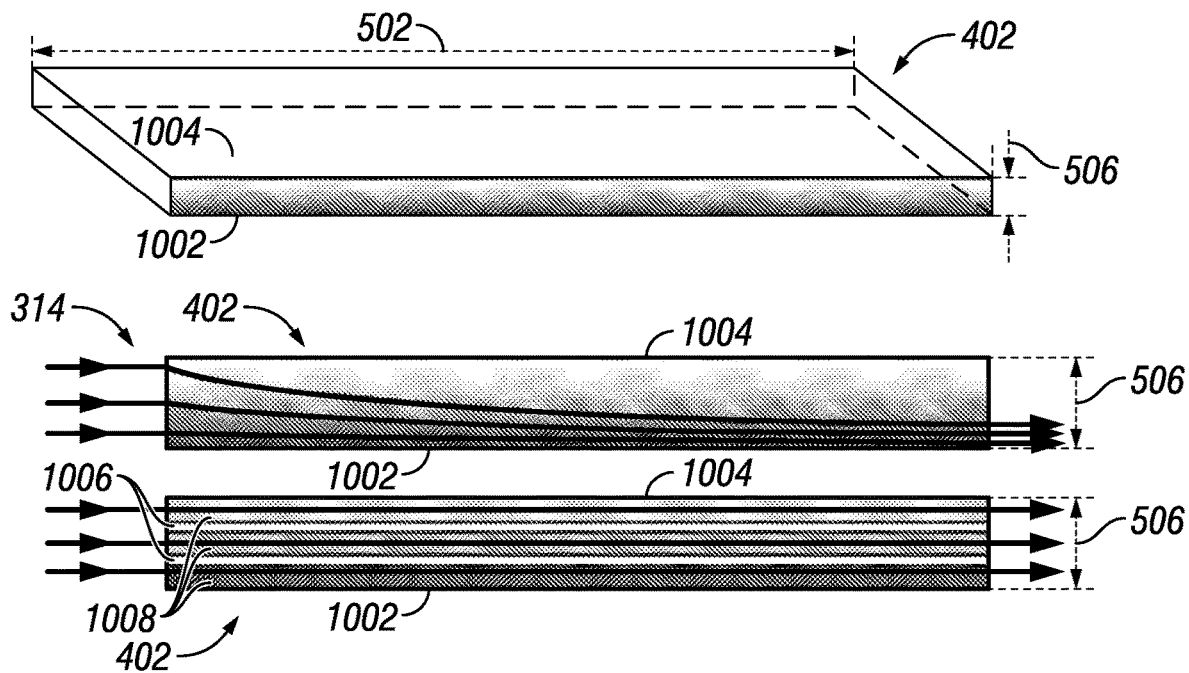
FIG. 10 depicts isometric and top views of another exemplary ferrite.

Referring now to FIG. 10, with continued reference to certain prior figures, illustrated is another exemplary ferrite 402. According to one or more embodiments, the thickness 506 of the ferrite 402 may be manipulated to counter non-homogeneity and thereby help control the direction, distribution, and/or angle 316 (FIG. 3B) of the magnetic field 314. More specifically, in some cases, there may be a higher concentration of ferrite material at a particular depth or location across the thickness 506 of the ferrite 402. For instance, as illustrated, there may be a higher concentration of ferrite material at the bottom 1002 of the ferrite 402 as opposed to the top 1004. This may occur if the ferrite material of the molded ferrite 402 is allowed to settle before the rubber/elastomer cures. In such cases, the permeability at the bottom 1002 of the ferrite 402 may be greater than at the top 1004, and the magnetic flux lines of the magnetic field 314 will tend to merge toward the bottom 1002. This may be seen in the middle image of FIG. 10.

To counter the non-homogeneity along the thickness 506, and thereby improve the direction of the magnetic field 314, one or more laminations 1006 may be positioned between adjacent layers 1008 of the ferrite 402, as shown in the lower image of FIG. 10. The laminations 1006 may be made of any non-magnetic, electrically insulating/non-conductive material such as, but not limited to, a polymer (e.g., polyimide), a rubber (e.g., RTV silicone), an elastomer, a ceramic, an epoxy material, and any combination thereof.

The laminated ferrite 402 of FIG. 10 may be fabricated by molding or otherwise providing thin ferrite strips 1008 that are then stacked and/or laminated with one or more laminations 1006. The ferrite strips 1008 each exhibit a decreased thickness 506, which effectively reduces the dimension in which the magnetic field 314 may change direction along the length 502. Since the laminations 1006 are non-magnetic, the laminations 1006 may exhibit a relative permeability of approximately 1 and may otherwise be equivalent to air-gapping the ferrite 402 between the top 1004 and the bottom 1002 at one or more depths. As a result, the magnetic flux lines of the magnetic field 314 may proceed more uniformly along the length 502 of the ferrite 402 between the laminations 1006. Accordingly, the laminated ferrite 402 may be fabricated to the original thickness 506, but with improved control over non-homogeneity by incorporating the laminations 1006.

Figure 11A:
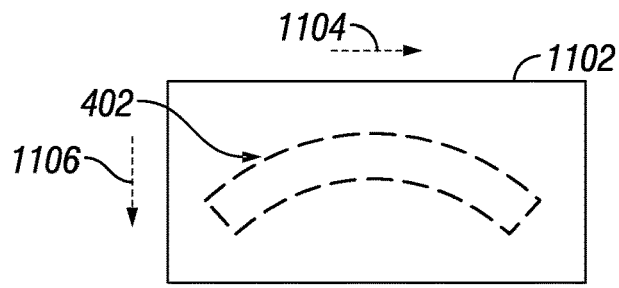
FIGS. 11A-11C depict another exemplary ferrite that may be machined out of a solid block of material.
Figure 11B:
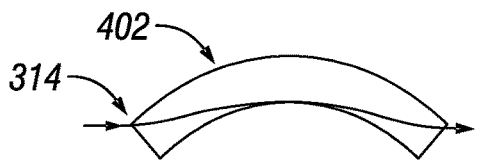
Figure 11C:
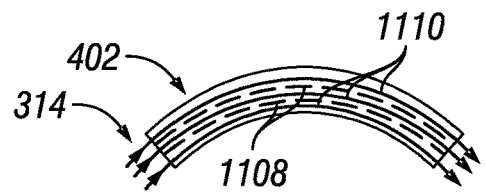

Referring now to FIGS. 11A-11C, illustrated is a ferrite 402 that may be machined out of a solid block of material 1102, according to one or more embodiments. The block of material 1102 may comprise a magnetic material that exhibits a known anisotropy. For example, the block of material 1102 may comprise an iron or ferrite powder that is pressed to form the block of material 1102 and that may later be machined to produce the ferrite 402. In at least one embodiment, the block of material 1102 may comprise a composite of iron particles and an organic binder such as FLUX-TROL® 100, a Trademark of Fluxtrol, Inc. In other examples, however, the block of material 1102 may comprise any magnetic material that may be processed to result in particle deformation favoring a particular direction, or with a process where the particles and/or magnetic domains may tend to orient themselves, or are intentionally oriented, in a particular direction (i.e., grain-oriented materials).

In pressing the ferrite material to form the block of material 1102, the iron/ferrite powder may be deformed such that it is elongated in the plane 1104 normal to the press direction 1106, and also flattened, deformed, and/or shortened in the press direction 1106. Thus, the magnetic path through the plane 1104 normal to the press may have fewer interfaces between particles. As a result, the magnetic permeability may be higher and more homogeneous and/or isotropic throughout the plane 1104 normal to the press, while there are more interfaces in the press direction 1106, which may lead to a lower relative permeability in that direction. FLUXTROL® 100, a Trademark of Fluxtrol, Inc., for example, may exhibits a relative permeability of approximately 120 in the plane 1104 normal to the press while it is only about 80 in the press direction 1106. This may create complicated non-homogeneity for complex ferrite geometries, such as the ferrites 402 of FIG. 4B.

In FIG. 11B, the ferrite 402 has been excised from the block of material 1102 in the general form of a curve. The ferrite 402 may be formed out of the block of material 1102 using any manufacturing technique including, but not limited to, laser cutting, water jetting, milling, machining, and any combination thereof. The curved geometry of the ferrite 402 may result in adverse effects on the direction and/or distribution of the magnetic field 314 proceeding through the ferrite 402.

In FIG. 11C, to improve the direction of the magnetic field 314 through the ferrite 402, one or more laminations 1108 (two shown) may be positioned between adjacent layers 1110 of the ferrite 402. Similar to the laminations 1106 of FIG. 10, the laminations 1108 may be made of any non-magnetic, electrically insulating/non-conductive material such as, but not limited to, a polymer (e.g., polyimide), a rubber (e.g., RTV silicone), an elastomer, a ceramic, an epoxy material, and any combination thereof.

The laminated ferrite 402 of FIG. 11 may be fabricated by machining thin ferrite strips 1110 out of the block of material 1102 that are then stacked and/or laminated with one or more laminations 1108. The ferrite strips 1110 each exhibit a decreased thickness, which effectively reduces the dimension in which the magnetic field 314 may deviate from the intended direction along the length 502. Moreover, since the laminations 1108 are non-magnetic, the laminations 1108 may exhibit a relative permeability of approximately 1 and may otherwise be equivalent to air-gapping the ferrite 402 at one or more depths. As a result, the magnetic flux lines of the magnetic field 314 may be constrained within the laminated areas and otherwise proceed more uniformly along the ferrite 402 between the laminations 1108. Accordingly, the laminated ferrite 402 may be fabricated to the original thickness, but with improved control of the magnetic field 314 by incorporating the laminations 1108. This may prove advantageous in providing more control over the magnetic field direction, distribution, and/or angle 316 (FIG. 3B).

Figure 12A:
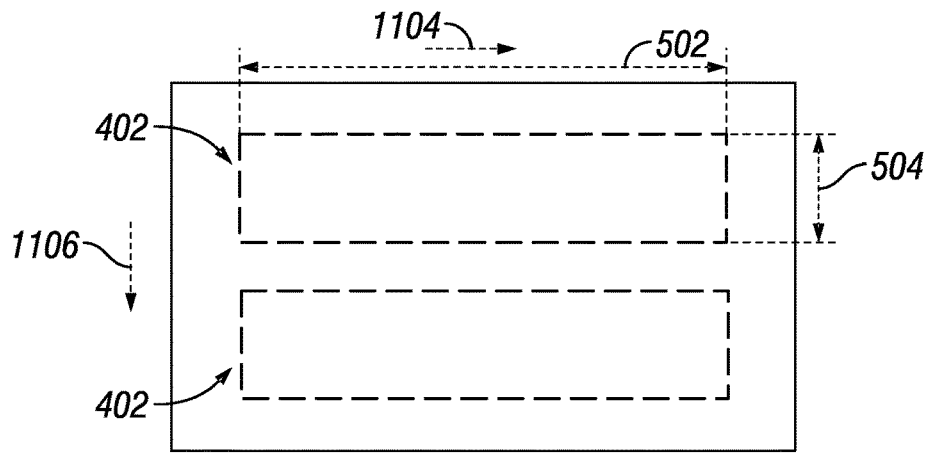
FIGS. 12A and 12B depict two exemplary ferrites that may be machined out of the solid block of material of FIG. 11A.
Figure 12B:
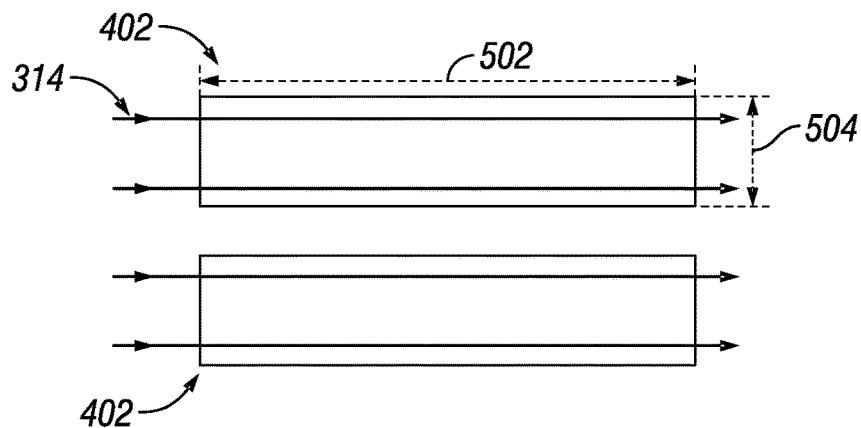

Referring now to FIGS. 12A and 12B, with continued reference to FIGS. 11A-11C, illustrated are two exemplary ferrites 402 that may be machined out of the solid block of material 1102, according to one or more embodiments. The anisotropy due to the lower permeability in the plane 1104 normal to the press may be used advantageously to guide the magnetic field 314 in a desired direction. In examples, for instance, the ferrites 402 may be machined out of the block of material 1102 with the length 502 aligned with the plane 1104 normal to the press. In such embodiments, lower permeability may be exhibited in the press direction 1106 (i.e., along the width 504 of the ferrites 402), which may discourage the magnetic field 314 from traveling in the press direction 1106. In other words, a grain direction may be generated in the ferrites 402 to complement the dividers 412 (FIG. 4A) of the bobbin 302 (FIG. 4A), which may already serve to air-gap and guide the magnetic field 314 to the desired direction/angle and/or distribution.

In examples, the ferrites may be co-located directly beneath the antenna on the outside of the bobbin or collar. The outer surface of the bobbin or collar may comprise a non-magnetic, non-conductive layer built onto the outer surface, and grooves may be machined or formed into the surface of the non-magnetic, non-conductive layer to receive ferrites. In examples, channels may be formed on an interior portion of the non-magnetic, non-conductive layer for receiving the ferrites and grooves for receiving the antenna are formed on a portion of the non-magnetic, non-conductive layer that is exterior to or outside of the portion forming the channels for receiving the ferrites. In this configuration the ferrites may be co-located beneath the antenna.

In examples, the bobbin comprises a first non-magnetic, non-conductive layer and a second non-magnetic, non-conductive layer disposed on the outer surface of the first layer, wherein the ferrites are co-located directly beneath the antenna within channels defined on an outer surface of the first layer.

Figure 13:
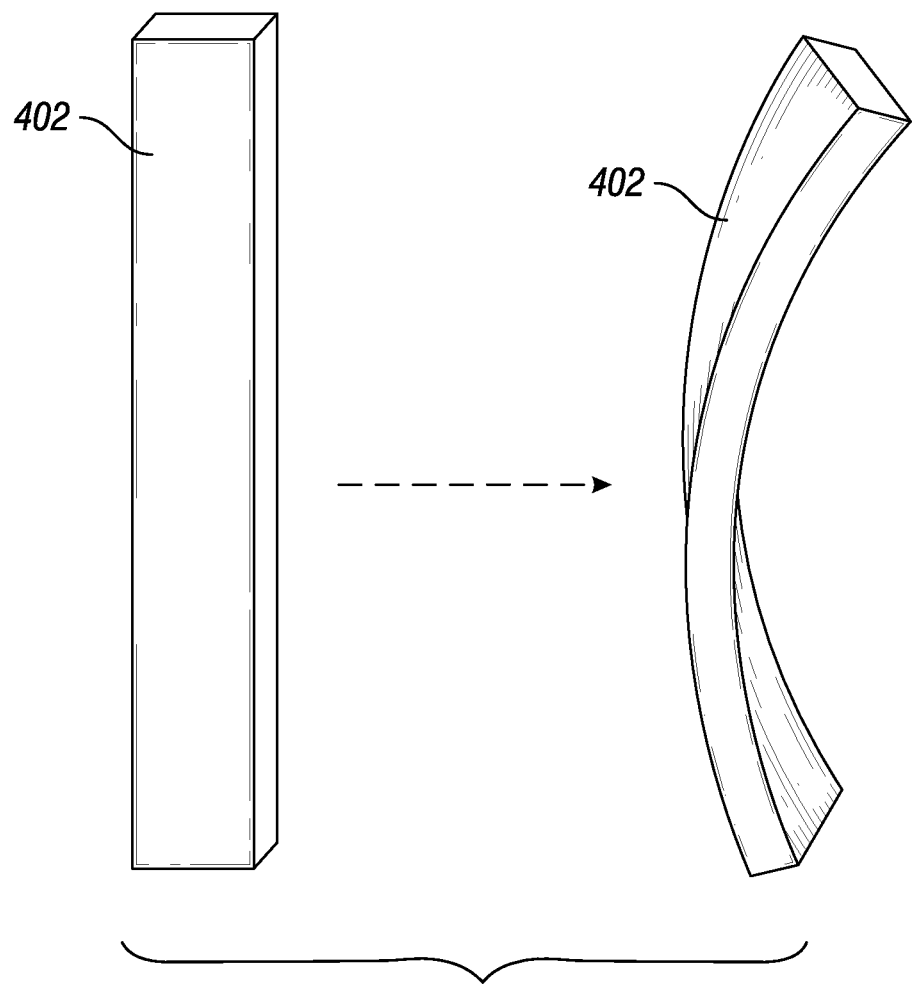
FIG. 13 illustrates molded ferrites and ferrites molded in a flexible manner.

Without limitation, referring to FIG. 13, the ferrites 402 may be formed in a flexible manner whereby they twist and conform to the curvature of the bobbin or collar and provide uniformity within the channels (e.g., referring to FIG. 4B). It is difficult however to optimize the design due to the complex geometry required to co-locate the ferrites 402 under the large antenna coil. In examples, a method for forming ferrites 402 in a flexible manner to twist and conform to the curvature of the bobbin or collar is provided. This method generally comprises providing an uncured ferrite material, placing the uncured ferrite 402 into preformed channels on a surface of a bobbin (e.g., referring to FIG. 4B), and curing the uncured ferrite 402 in place on the bobbin. Previous methods of forming ferrite materials that included methods such as machining and/or forming the ferrite 402 in a mold have several disadvantages in this regard. For example, machining ferrite materials in complex geometries is prohibitively impractical, and only allow the manufacture of simple geometries. These machined ferrites having simple geometries limit the types of designs for large tilted antennas by requiring antenna designs which may accommodate these geometries. In turn, the resultant antenna designs have configurations that may adversely affect the field angle. In addition, while existing technologies for molding ferrites may provide ferrites having a specific complex geometric shape, such ferrites materials in practice may have a thick consistency and may be difficult to press into tight corresponding channels on a bobbin. Thus, the ferrites 402 frequently do not form a perfect complement with the corresponding channels, which results in the formation of voids. Also, breakage of the ferrites 402 may be a concern when removing the ferrites 402 from a mold. Ferrites 402 may generally be brittle material and prone to breaking when removing from a mold unless the shape is sufficiently thick. Thus, molded ferrites 402 are limited in the shapes and sizes in which they may be cast prior to removal for placement into the bobbin.

Curing the uncured ferrite material in place on a bobbin has the combined advantages of using materials that may be prefabricated (e.g., simply die cut) into very simple geometries (small prefabrication burden) and that are amenable to producing complex geometries by conforming to pocket cutouts (channels) on the bobbin. In addition, this method enables the production of ferrites having a long dimension perpendicular to the coil windings of the antenna. In this configuration, the long dimension of the ferrites is parallel to the natural field angle, thus achieving the desired gain without manipulating the effective field angle of the tilted antenna.

Co-located, flexible, conforming ferrites may be prepared by providing an uncured ferrite material into preformed channels on the collar or bobbin, and curing the uncured ferrite material in place on the tool. The preformed channels thus serve as a mold for forming flexible ferrites that conform and twist to the shape of the tool in which they are integrated. The preformed channels may be any of those described herein for receiving a flexible ferrite.

The uncured ferrite material may be provided in any suitable form. In examples, the uncured ferrite material is provided in powder form or as a plurality of pieces cut from a solid uncured ferrite material. The pieces cut or machined from a solid uncured ferrite material may be of any suitable geometrical shape, and may depend on the size, shape, and depth of the channels in which the pieces are intended to be placed. In examples, the pieces may be flat. In examples, the solid uncured ferrite pieces have a geometrical shape selected from the group consisting of triangles, squares, rhombuses, rectangles, circles, ovals, pentagons, hexagons, heptagons, octagons, and combinations thereof. In some embodiments, the uncured ferrite pieces have a flat, rectangular shape.

The uncured ferrite material is placed into the preformed channels, where it conforms to the intricate geometry of the preformed channel mold. In examples, the uncured ferrite material completely fills the mold. In examples, the uncured ferrite material partially fills the mold. In still further embodiments, the uncured ferrite material is pressed or compacted into the mold. In examples, the uncured ferrites are pressed into the channels such that they curve and twist to conform to the curvature of the channels.

The uncured ferrite material is then cured in place within the preformed channel molds. Curing the uncured ferrite material may comprise any suitable method. In examples, the uncured ferrite material is cured within the preformed channel molds by heating the uncured ferrite material to a sufficient temperature for a sufficient period of time. In some embodiments, the curing temperature is in the range of about 100° C. to about 400° C., about 90° C. to about 350° C., about 120° C. to about 300° C., about 110° C. to about 250° C., about 150° C. to about 200° C., about 130° C. to about 190° C., about 140° C. to about 160° C., or about 150° C. to about 190° C. In examples, the curing temperature is greater than about 100° C., 110° C., 115° C., 120° C., 125° C., 130° C., 140° C., or 150° C. The curing time may be any suitable time, for example, 1 hr, 2 hr, 3 hr, 4 hr, 5 hr, 6 hr, or more. In examples, the curing process is conducted at a first temperature for a first period of time, followed by a second temperature for a second period of time, wherein the first and second curing temperatures can be any of the temperatures described above.

Co-locating the ferrites beneath the antenna may enhance the gain of the antenna while preserving the angle of the antenna with respect to the tool. Table 1 below compares the gain of the antenna with flexible ferrites to the antenna without ferrites, and shows the signal level for one transmitter-receiver set is greatly improved as compared to the signal level without ferrites.

TABLE 1

Comparison of Antenna Gain with and without Flexible Ferrite

| Gain of Tilted Coil Antenna Design (kHz) | Dipole Response (Antenna Alone) | Dipole response (Antenna on Mandrel without Ferrites) | Dipole Response (Antenna on Mandrel with Exemplary Ferrites) |
|---|---|---|---|
| 0.5 | 1 | 0.3283 | 1.2677 |
| 1 | 1 | 0.2943 | 1.2423 |
| 2 | 1 | 0.2702 | 1.2220 |
| 8 | 1 | 0.2377 | 1.1926 |
| 32 | 1 | 0.2210 | 1.1790 |

TABLE 1-continued

Comparison of Antenna Gain with and without Flexible Ferrite

| Gain of Tilted Coil Antenna Design (kHz) | Dipole Response (Antenna Alone) | Dipole response (Antenna on Mandrel without Ferrites) | Dipole Response (Antenna on Mandrel with Exemplary Ferrites) |
|---|---|---|---|
| Gain relative to that of Antenna without Ferrites at −8 khZ | N/A | 1 | 5.02 |
| Signal level (gain squared) relative to that of Antenna without Ferrites −8 kHz | N/A | 1 | 25.17 |

The systems and methods may include any of the various features of the systems and methods disclosed herein, including one or more of the following statements.

Statement 1: A method may comprise pressing an uncured ferrite material into a channel defined on a surface of a bobbin associated with a resistivity logging tool, wherein the channel is arcuate and extends at an angle offset from a central axis of the bobbin; and curing the uncured ferrite material within the channel thereby producing a cured ferrite material, wherein the cured ferrite material conforms to the channel.

Statement 2. The method of statement 1, wherein the uncured ferrite material comprises a binder selected from the group consisting of a rubber, an elastomer, an epoxy material, a polymer, and a ceramic.

Statement 3. The method of statements 1 or 2, further comprising preparing an uncured ferrite material by mixing a ferrite powder with a binder and rolling the ferrite powder and the binder between adjacent rollers.

Statement 4. The method of statements 1-3, wherein the uncured ferrite material comprises one or more pieces of a solid, uncured ferrite material, wherein the one or more pieces have a flat rectangular shape.

Statement 5. The method of statements 1-4, wherein the bobbin comprises a non-magnetic, non-conducting layer disposed on at least a portion of the outer surface of the bobbin, wherein the non-magnetic, non-conducting layer comprises a material selected from the group consisting of a polymer, a rubber, an elastomer, an epoxy material, a ceramic, and any combination thereof.

Statement 6. The method of statement 5, wherein the channel is defined on an outer surface of the non-magnetic, non-conducting layer.

Statement 7. The method of statement 6, wherein a second non-magnetic, non-conducting layer is disposed on at least a portion of the outer surface of the bobbin, the second non-magnetic, non-conducting layer comprising a coil winding wrapped around the second layer and extending axially along at least a portion thereof.

Statement 8. The method of statement 7, wherein the coil winding is formed within corresponding grooves defined on an outer surface of the second layer.

Statement 9. The method of statement 8, wherein a long dimension of the cured ferrite material extends in a direction perpendicular to a direction of the coil winding.

Statement 10. A resistivity logging tool may comprise a tool mandrel; a bobbin positioned about the tool mandrel and having a cylindrical body that provides an inner surface and an outer surface, wherein a plurality of channels are defined on a surface and laterally adjacent channels are separated by a divider extending radially inward from the inner surface; a coil winding wrapped about the outer surface of the body at an angle offset from a central axis of the body; and a plurality of ferrites cast and cured within the plurality of channels and interposing the coil winding and the tool mandrel, wherein the dividers prevent physical contact between laterally adjacent ferrites and each ferrite conforms to a geometry of a corresponding one of the plurality of channels.

Statement 11. The resistivity logging tool of statement 10, wherein the bobbin and the divider each comprise a material selected from the group consisting of a plastic, a thermoplastic, an epoxy material, a polymer, a ceramic, and any combination thereof.

Statement 12. The resistivity logging tool of statements 10 or 11, wherein each ferrite is a cast and cured ferrite formed by pressing an uncured ferrite material into the plurality of channels and curing the uncured ferrite material in place on the resistivity logging tool.

Statement 13. The resistivity logging tool of statements 10-12, wherein each ferrite comprises a binder selected from the group consisting of a rubber, an elastomer, an epoxy, a polymer, a ceramic, and any combination thereof.

Statement 14. A method of fabricating a ferrite for use in a resistivity logging tool, comprising: providing an uncured ferrite material; casting the uncured ferrite material into a channel defined on a surface of a bobbin associated with the resistivity logging tool; and curing the uncured ferrite material within the channel thereby forming a cured ferrite material, wherein the cured ferrite material conforms to the channel, and the channel is arcuate and extends at an angle offset from a central axis of the bobbin.

Statement 15. The method of statement 14, wherein the uncured ferrite material comprises a binder selected from the group consisting of a rubber, an elastomer, an epoxy material, a polymer, and a ceramic.

Statement 16. The method of statements 14 or 15, wherein each ferrite is a formed within the channel by mixing an uncured ferrite powder with a binder to provide a mixture that is pressed into the channel.

Statement 17. The method of statements 14-16, wherein the uncured ferrite material comprises one or more pieces of a solid, uncured ferrite material, and the one or more pieces have a flat rectangular shape.

Statement 18. The method of statements 14-17, further comprising preparing the uncured ferrite material by mixing a ferrite powder with a binder and rolling the ferrite powder and the binder between adjacent rollers.

Statement 19. The method of statements 14-18, wherein the bobbin comprises a non-magnetic, non-conducting layer disposed on at least a portion of the outer surface of the bobbin, wherein the non-magnetic, non-conducting layer comprises a material selected from the group consisting of a polymer, a rubber, an elastomer, an epoxy material, a ceramic, and any combination thereof.

Statement 20. The method of statements 14-19, wherein the channel is defined on an outer surface of the non-magnetic, non-conducting layer.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
pressing an uncured ferrite material into a channel defined on an outer surface of a bobbin of a resistivity logging tool, wherein the channel is arcuate and extends at an angle offset from a central axis of the bobbin, and wherein the uncured ferrite material comprises a ferrite powder and a binder; and
curing the uncured ferrite material within the channel thereby producing a cured ferrite material, wherein the cured ferrite material conforms to the channel.

2. The method of claim 1, wherein the binder selected from the group consisting of a rubber, an elastomer, an epoxy material, a polymer, and a ceramic.

3. The method of claim 1, further comprising preparing the uncured ferrite material by mixing the ferrite powder with the binder and rolling the ferrite powder and the binder between adjacent rollers.

4. The method of claim 1, wherein the uncured ferrite material comprises one or more pieces of a solid, uncured ferrite material, wherein the one or more pieces have a flat rectangular shape.

5. The method of claim 1, wherein the bobbin comprises a non-magnetic, non-conducting layer disposed on at least a portion of the outer surface of the bobbin, wherein the non-magnetic, non-conducting layer comprises a material selected from the group consisting of a polymer, a rubber, an elastomer, an epoxy material, a ceramic, and any combination thereof.

6. The method of claim 5, wherein the channel is defined on an outer surface of the non-magnetic, non-conducting layer.

7. The method of claim 6, wherein a second non-magnetic, non-conducting layer is disposed on at least a portion of the outer surface of the bobbin, the second non-magnetic, non-conducting layer comprising a coil winding wrapped around the second layer and extending axially along at least a portion thereof.

8. The method of claim 7, wherein the coil winding is formed within corresponding grooves defined on an outer surface of the second layer.

9. The method of claim 8, wherein a long dimension of the cured ferrite material extends in a direction perpendicular to a direction of the coil winding.

10. A resistivity logging tool, comprising:
a tool mandrel;
a bobbin positioned about the tool mandrel and having a cylindrical body with an inner surface and an outer surface, wherein a plurality of channels are defined on the outer surface and laterally adjacent channels are separated by dividers;
a coil winding wrapped about the outer surface of the body at an angle offset from a central axis of the body; and
a plurality of ferrites cast and cured within the plurality of channels and interposing the coil winding and the tool mandrel, wherein the dividers prevent physical contact between laterally adjacent ferrites and each ferrite conforms to a geometry of a corresponding one of the plurality of channels.

11. The resistivity logging tool of claim 10, wherein the bobbin and the divider each comprise a material selected from the group consisting of a plastic, a thermoplastic, an epoxy material, a polymer, a ceramic, and any combination thereof.

12. The resistivity logging tool of claim 10, wherein each ferrite is a cast and cured ferrite formed by pressing an uncured ferrite material into the plurality of channels and curing the uncured ferrite material in place on the resistivity logging tool.

13. The resistivity logging tool of claim 10, wherein each ferrite comprises a binder selected from the group consisting of a rubber, an elastomer, an epoxy, a polymer, a ceramic, and any combination thereof.

14. They system of claim 10, wherein the bobbin comprises a non-magnetic, non-conducting layer that forms an outer layer of the bobbin, wherein the non-magnetic, non-conducting layer comprises a material selected from the group consisting of a polymer, a rubber, an elastomer, an epoxy material, a ceramic, and any combination thereof, and wherein the channel is defined on the outer surface of the non-magnetic, non-conducting layer.

15. A method of fabricating a ferrite for use in a resistivity logging tool, comprising:
   providing an uncured ferrite material, wherein the uncured ferrite material comprises a ferrite powder and a binder;
   pressing the uncured ferrite material into a channel defined on an outer surface of a bobbin of the resistivity logging tool; and
   curing the uncured ferrite material within the channel thereby forming a cured ferrite material, wherein the cured ferrite material conforms to the channel, and the channel is arcuate and extends at an angle offset from a central axis of the bobbin.

16. The method of claim 15, wherein the binder selected from the group consisting of a rubber, an elastomer, an epoxy material, a polymer, and a ceramic.

17. The method of claim 15, wherein each ferrite is a formed within the channel by mixing the ferrite powder with the binder to provide a mixture that is pressed into the channel.

18. The method of claim 15, wherein the uncured ferrite material comprises one or more pieces of a solid, uncured ferrite material, and the one or more pieces have a flat rectangular shape.

19. The method of claim 15, further comprising preparing the uncured ferrite material by mixing the ferrite powder with the binder and rolling the ferrite powder and the binder between adjacent rollers.

20. The method of claim 15, wherein the bobbin comprises a non-magnetic, non-conducting layer disposed on at least a portion of the outer surface of the bobbin, wherein the non-magnetic, non-conducting layer comprises a material selected from the group consisting of a polymer, a rubber, an elastomer, an epoxy material, a ceramic, and any combination thereof, and wherein the channel is defined on an outer surface of the non-magnetic, non-conducting layer.

* * * * *